United States Patent
Macrae

(10) Patent No.: US 9,249,658 B2
(45) Date of Patent: Feb. 2, 2016

(54) DOWNHOLE DATA COMMUNICATION AND LOGGING SYSTEM

(76) Inventor: Jonathan Macrae, Houston, TX (US)

(*) Notice: Subject to any disclaimer, the term of this patent is extended or adjusted under 35 U.S.C. 154(b) by 213 days.

(21) Appl. No.: 13/542,380

(22) Filed: Jul. 5, 2012

(65) Prior Publication Data

US 2014/0008059 A1      Jan. 9, 2014

(51) Int. Cl.
*E21B 47/12*      (2012.01)
*E21B 47/14*      (2006.01)
*E21B 10/62*      (2006.01)
*G01V 11/00*      (2006.01)

(52) U.S. Cl.
CPC ............... *E21B 47/12* (2013.01); *E21B 10/62* (2013.01); *E21B 47/124* (2013.01); *E21B 47/14* (2013.01); *G01V 11/002* (2013.01); *G01V 2200/16* (2013.01)

(58) Field of Classification Search
USPC ......... 166/250.01, 66, 254.2, 113; 175/40, 50
See application file for complete search history.

(56) References Cited

U.S. PATENT DOCUMENTS

| | | | |
|---|---|---|---|
| 5,996,711 A * | 12/1999 | Ohmer | ............................ 175/61 |
| 6,957,708 B2 | 10/2005 | Chemali et al. | |
| 7,134,493 B2 | 11/2006 | Runia | |
| 8,022,838 B2 | 9/2011 | Murphy | |
| 2006/0254764 A1 * | 11/2006 | Zuilekom | ....................... 166/66 |
| 2007/0126595 A1 * | 6/2007 | Murphy | ..................... 340/853.7 |
| 2008/0074948 A1 | 3/2008 | Reckmann | |
| 2009/0166031 A1 | 7/2009 | Hernandez | |
| 2009/0236091 A1 * | 9/2009 | Hammami et al. | ......... 166/242.1 |
| 2009/0255669 A1 * | 10/2009 | Ayan et al. | ............... 166/250.15 |
| 2010/0223988 A1 * | 9/2010 | Crow et al. | ................ 73/152.04 |
| 2011/0051552 A1 * | 3/2011 | Pistre et al. | ..................... 367/33 |
| 2011/0160375 A1 * | 6/2011 | Noguchi et al. | .............. 524/495 |

FOREIGN PATENT DOCUMENTS

EP            0539240 A2      4/1993

OTHER PUBLICATIONS

International Search Report and the Written Opinion for International Application No. PCT/US2013/048842 dated Oct. 17, 2013.

\* cited by examiner

*Primary Examiner* — Taras P Bemko
(74) *Attorney, Agent, or Firm* — Fletcher Yoder, P.C.

(57) ABSTRACT

A logging system and method for use in a wellbore formed in an earth formation. A tubular conduit that extends from the surface into the wellbore is included in the system. The conduit includes a stabilizer with sensors to obtain data from the wellbore. A communication interface is used to communicate data from the stabilizer to the logging tool string. Also, a surface communication and control device, along with a telemetry device can be included in the system. The telemetry device could be used to send and receive data to and/or from the surface communication and control device, if needed. Also provided is a logging tool string that is capable of passing from a position within the conduit to a position outside the lower end of the conduit. In addition, a memory storage device used to and store data collected from the wellbore for further analysis and communication.

23 Claims, 4 Drawing Sheets

DOWNHOLE DATA COMMUNICATION AND LOGGING SYSTEM

BACKGROUND

It is useful to know certain characteristics of a borehole for drilling operations. In order to gather info about the borehole, drillers often use wireline or logging while drilling (LWD) tools that retrieve data and produce logs or even images representing the characteristics of the formations penetrated by the borehole. Gathering data can be done using a variety of logging tools. Some logging tools measure a number of geological characteristics including density, porosity, resistivity, magnetic resonance, and formation pressure. These logging tools are used as part of a logging system.

Logging systems used for logging earth formations can include wireline operated logging tools and wireless logging tools. Typically, wireless logging tools are battery powered and are provided with an electronic memory for storing the logging data. After conducting a logging run, the tool is retrieved to surface where the logging data are read out from the electronic memory.

One problem relating to the use of wireless logging tools is that during logging no information is available to the operator with regard to the functioning of the logging tool. For example, in case the logging tool is not correctly deployed in the borehole during the logging operation, the operator will notice the incorrect deployment only during read out of the electronic memory. Notice of this incorrect deployment may not be discovered until after one or more logging runs have been carried out. In such unfortunate situations, valuable drilling rig time is lost, especially when one is required to re-run the logging tool in the same wellbore interval. In addition, some circumstances may prevent re-running the logging tool in the same wellbore interval, leading to the loss of useful logging data for the interval.

BRIEF DESCRIPTION OF THE DRAWINGS

A better understanding of the various disclosed system and method embodiments can be obtained when the following detailed description is considered in conjunction with the drawings, in which.

DETAILED DESCRIPTION

Accordingly, disclosed herein is a logging system and method for collecting data in a wellbore. Some embodiments for a logging system as such include a conduit extending into a wellbore from the surface, a logging tool string capable of extending from the lower end of the conduit, and a drill stabilizer coupled to the conduit that includes electronics. The electronics in the drill stabilizer are able to wirelessly communicate with the logging tool string. A sensor, located in the drill stabilizer, is electrically coupled to communicate with a memory storage unit, and a communication interface that transfers data from one area of the drill string to another. The communication interface is made up of a communication device located in the drill string, and another communication device located in the logging tool string.

A method embodiment includes lowering a conduit into the wellbore from its surface, passing a logging tool string from the lower end of the conduit further into the wellbore, inducing the sensor(s) in the drill stabilizer to collect data from the wellbore, and transmitting the collected data is = to the communication device located in the logging tool string.

Figure 1:
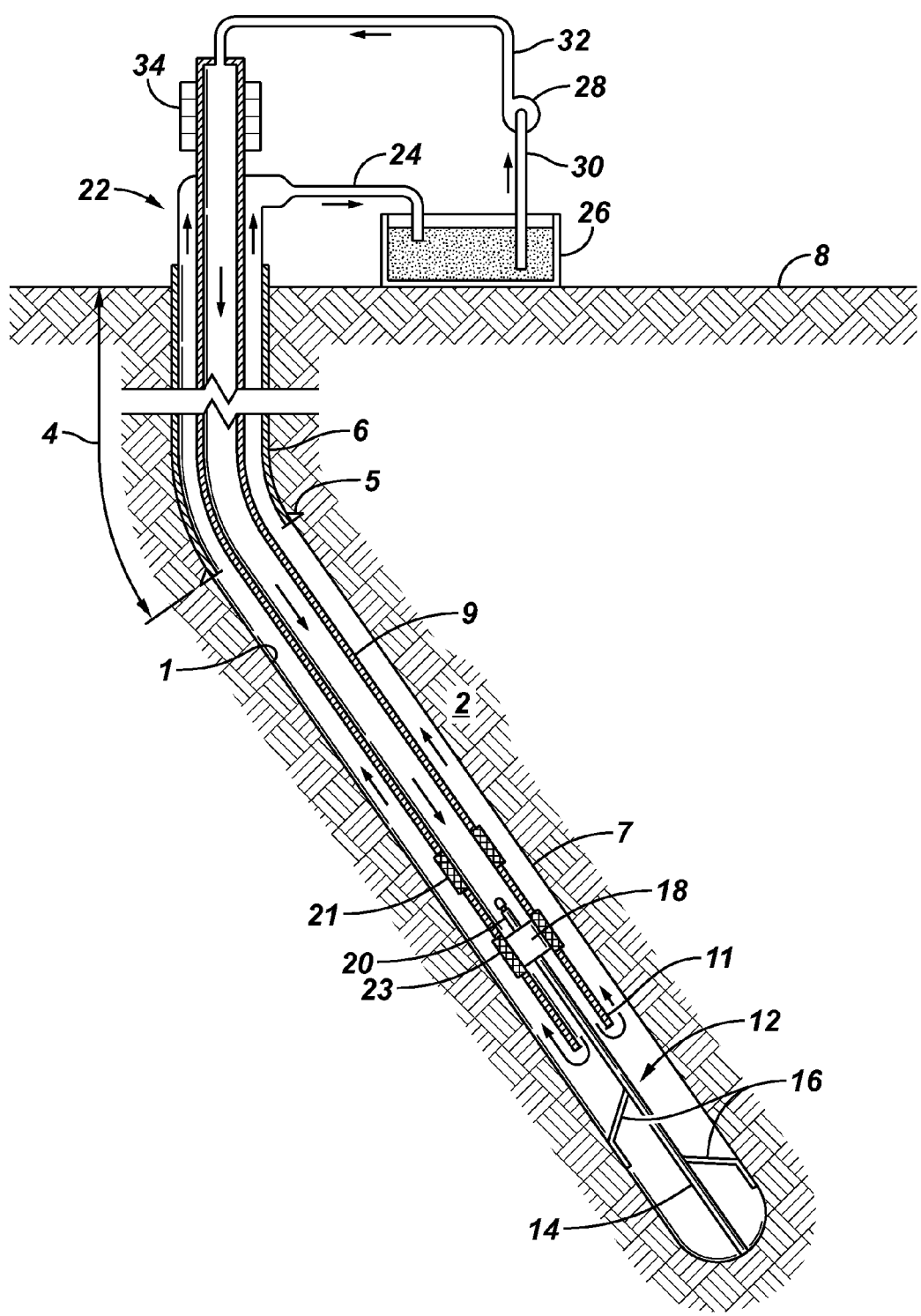
FIG. 1 is an illustrative logging system using a tubular conduit extending into the wellbore.
Figure 2:
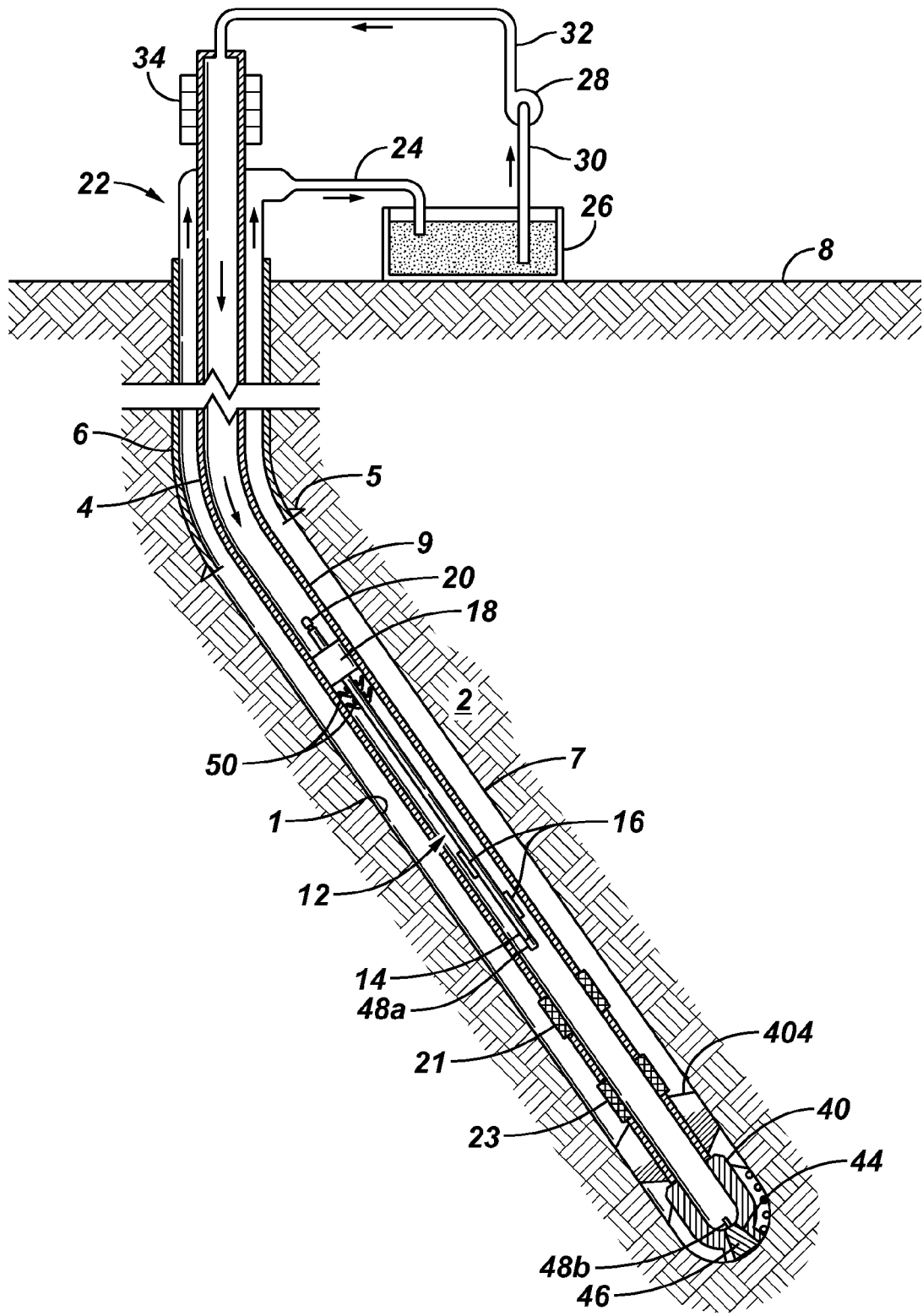
FIG. 2 is an illustrative logging system using a drill string extending into the wellbore.
Figure 3:
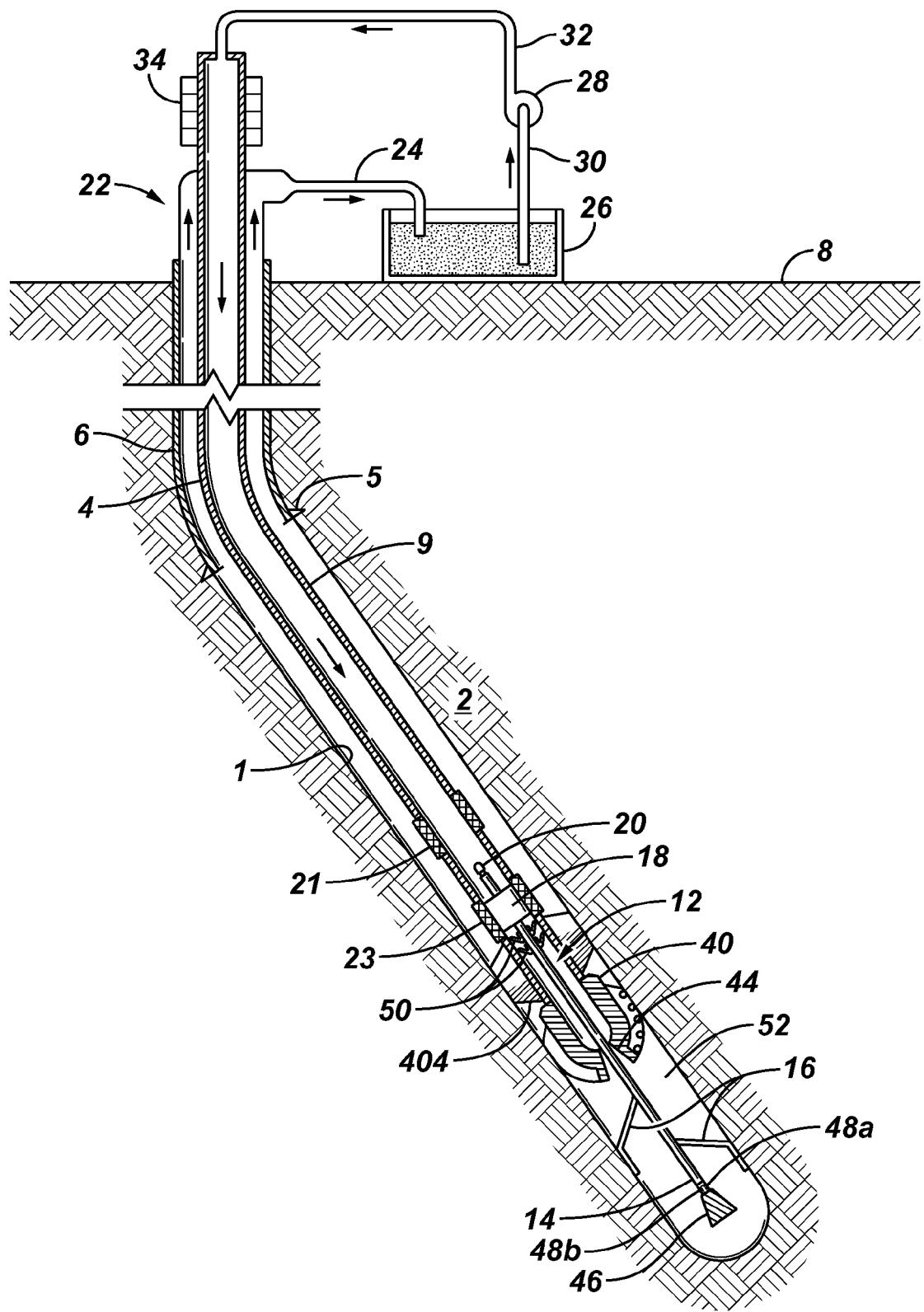
FIG. 3 shows a schematic of FIG. 2 during a further stage of the operation.

FIGS. 1-3 illustrate the working environment for such logging systems, and are simply used to give a detailed explanation of the overall working environment. A wellbore 1 is formed in an earth formation 2. The wellbore may be filled with a drilling fluid or a hydrocarbon fluid or another fluid. The wellbore 1 has an upper portion 4 provided with a casing 6 extending from a drilling rig or a production facility (not shown) at surface 8 into the wellbore 1 to a casing shoe 5, and an open lower portion 7 extending below the casing shoe 5.

A tubular conduit 9 extends from the surface 8 into the wellbore 1 where an open lower end 11 is placed in the open lower portion 7 of the wellbore 1. The tubular conduit 9 may also contain a fluid, such as the same fluid that fills the wellbore 1. A wellhead 22 is connected to the upper end of the casing 5. The wellhead 22 may be connected to a production facility, but as shown in FIG. 1 it is provided with an outlet conduit 24 emptying into a fluid reservoir 26 which may include a suitable sieve means (not shown) for removing particulates from the fluid. A pump 28 with an inlet 30 and an outlet 32 may be arranged to pump a fluid from the fluid reservoir 26 into the upper end of the tubular conduit 9.

A logging tool string 12, capable of passing through the tubular conduit 9 by being lowered or raised through the tubular conduit 9, is retrievably suspended in the tubular conduit 9 by suitable means (not shown). Suitable means may include a wireline or a gripping mechanism. In the embodiment as shown in FIG. 1, the upper end of the logging tool string 12 is provided with a latch 20 for latching of a wireline (not shown) to the logging tool string 12. A surface communication and control system 34 located at surface is connected to the tubular conduit 9 for sending or receiving signals representing the commands and/or data back and forth to the telemetry device 21. It is possible for the surface communication and control system 34 to automatically issue commands to the logging tool string 12 or vice versa. For example, incorrect deployment of the arms 16 can be detected and corrected in this manner at an early stage.

FIG. 2 is similar to FIG. 1, except with respect to the following aspects. The tubular conduit 9 is a drill string, with a drill bit 40 attached at its lower end. The logging tool string 12 is shown as being lowered through the drill string 9. The drill bit 40 is provided with a passage 44 in fluid communication with the interior of the drill string 9. A closure element 46 is removablly located in the passage 44 and may be removed from the passage 44 in an outward direction. The lower end of the logging tool string 12 and the upper end of the closure element 46 are provided with respective co-operating latching members 48a, 48b capable of latching the logging tool string 12 to the closure element 46.

In addition, closure element 46 has a latching mechanism (not shown) for latching the closure element 46 to the drill bit 40. The latching mechanism is arranged to co-operate with the latching members 48a, 48b in a manner that the closure element 46 unlatches from the drill bit 40 upon latching of latching member 48a to latching member 48b. The latching mechanism may also be arranged such that the closure element 46 latches to the drill bit 40, and thereby closes passage 44, upon unlatching of latching member 48a from latching member 48b.

Furthermore, the logging tool string 12 may be provided with pump cups 50 for pumping the logging tool string 12 through the drill string, either in downward or upward direction thereof, and/or a latch 20 for latching of a wireline (not shown) to the logging tool string 12. Both FIG. 2 and FIG. 3 show the drill stabilizer 404.

FIG. 3 shows the embodiment of FIG. 2 during a further stage of operation when the logging tool string 12 has been latched to the closure element 46 and the closure element 46 has been unlatched from the drill bit 40. The drill string 9 has been raised in the wellbore 1 so as to leave a space 52 between the drill bit 40 and the wellbore bottom. The logging tool string 12 is suspended by the drill string 9, in a manner that the sensor portion of the tool 14 extends through the passage 44 to below the drill bit 40, and that a first member 18 of a communication interface within the logging tool string 12 is aligned with a second member 23 of the communication interface located in the drill string 9.

Figure 4:
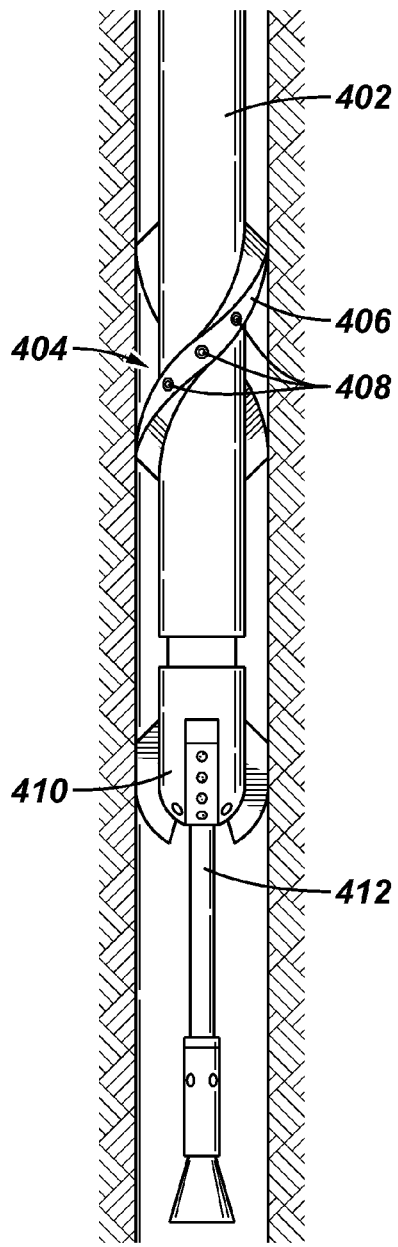
FIG. 4 shows an illustrative drill stabilizer and logging tool string.

FIG. 4 shows a conduit 402 with a drill stabilizer 404 that includes stabilizer blades 406 with mechanically affixed to the conduit 402 (e.g., embedded in a stabilizer blade 406). A logging tool string 412 can be lowered from the lower end portion of the conduit 402 outside the drill bit 410. The stabilizer blades 406 may cooperate with additional stabilizer blades to keep the tool 412 centered in the borehole. Each of the stabilizer blades 406 maintains the sensors 408 in close proximity to, or in contact with, the borehole wall.

In some embodiments, the sensors 408 can include measurement electrodes capable of ultrasonic measurements. Ultrasonic sensors work on a principle similar to radars or sonars which evaluate attributes of a target by interpreting the echoes from radio or sound waves, respectively. Ultrasonic sensors generate high frequency sound waves and evaluate the echo which is received back by the sensor. Sensors calculate the time interval between sending the signal and receiving the echo to determine the distance to an object. In some embodiments, ultrasonic sensors can come in the form of transceivers that can send and receive data. Other embodiments can include micro-resistivity or optical measurement sensors. The measure of a formation's resistivity is the resistance to the passage of an electric current. There are three categories of resistivity measurements: laterologs, induction logs, and micro-resistivity measurements. The resistivity logs are usually presented in a logarithmic scale. The micro-resistivity logs measure the resistivity of the formation very close to the borehole, in the zone that has been flushed by the drilling fluid. Also, optical sensors can become important in high-temperature, thermal recovery applications to provide insight into the subsurface to optimize resource extraction.

The method embodiment includes measuring borehole or formation characteristics from the wellbore that can be used by lowering a conduit into the wellbore, passing a logging tool string from the lower end of the conduit to take measurements, inducing the sensor(s) in the drill stabilizer to collect data, and communicating the collected data from the drill stabilizer wirelessly through a communication interface to the logging tool string. A memory storage unit can also be used to collect data.

The conduit 402 is lowered into the wellbore, leaving the bit 410 off of the bottom of the wellbore as shown in FIGS. 3 and 4. Wireline tools can be lowered through the conduit 402 to the bit drill 410 and out into the open hole where the logging tools are suspended from the drill bit 410. After tools are checked for quality operation and released from the wireline, they gather formation data in memory mode, logging past all problem zones of the wellbore, as the pipe is tripped back to the surface.

In each of the embodiments, the communications interface between the logging tool string 12 and the electronics in the drill stabilizer 404 may be a wireless based communication such as radio frequency transmissions, electromagnetic frequency transmissions, inductive couplings, capacitance couplings, or a combination of these communication methods. Alternatively, the communication interface may comprise a plug and socket arrangement that mate or interconnect when the logging tool string 12 is suspended by the conduit 9.

Figure 5:
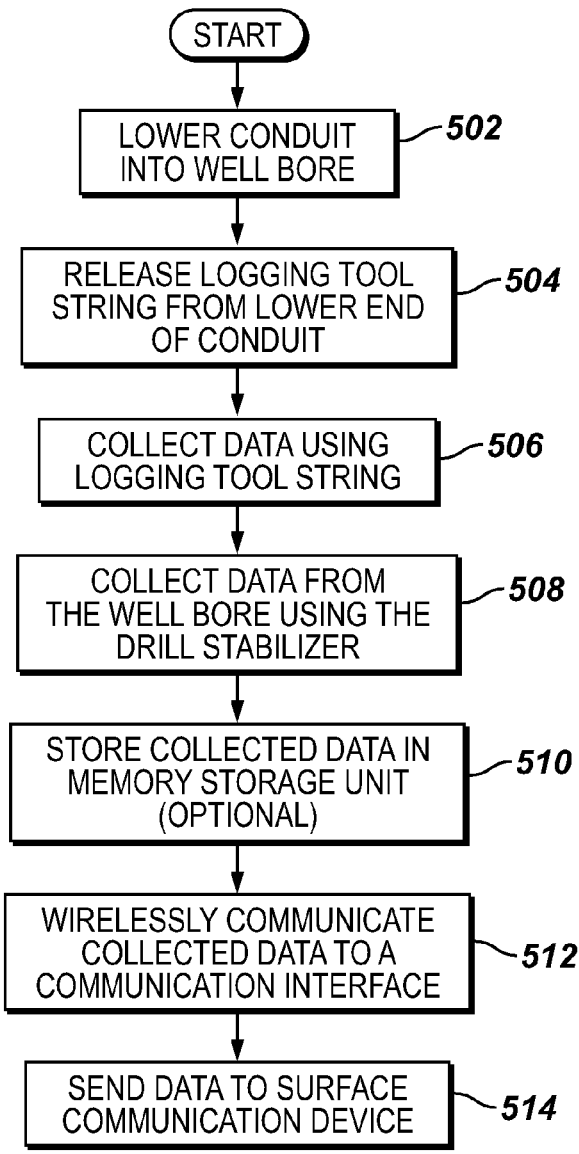
FIG. 5 is a flowchart of an illustrative logging method.

FIG. 5 shows an illustrative method for logging data from inside a wellbore. In block 502, a conduit is lowered into a wellbore from the surface. If necessary, the drilling of the wellbore may take place first. The conduit 9 is lowered into the wellbore until total depth is reached. Then the conduit is lifted off total depth enough to accommodate the logging tool string. In block 504, the logging tool string is protruded out of the bottom portion of the conduit further into the wellbore. It should be noted that the logging tool can be lowered out of the bit using gravity, and slowed to a stop. In block 506, the logging tool 412 may be induced to collect data from the wellbore using a variety of sensors in the logging tool string 412. A battery and memory device in the logging too string 412 may also be activated to power the sensors and store collected sensor data. Next, a drill stabilizer is used to collect data from the wellbore using at least one sensor embedded within at least one blade of the stabilizer, as shown in block 508. In block 510, the collected data may be stored in a memory storage unit in the stabilizer. However, this portion of the method is optional. Finally, in blocks 512 and 514, the data acquired is communicated via a communication interface using a wireless signal to the logging tool string. The communicated data may be stored in a memory unit in the logging tool string for later retrieval. Alternatively, the communicated data is sent to a surface communication and control system. This may be done by sending a signal up the wireline to the surface or through other telemetry systems.

Different embodiments for a logging system and method are presented. In at least one embodiment, a logging system is comprised of a conduit extending into the wellbore from the surface, a logging tool string, and a drill stabilizer with electronics. The electronics in the stabilizer can consists of at least one of a variety of sensors, including but not limited to, those capable of ultrasonic measurements, micro-resistivity measurements, optical measurements, or any other sensor suitable for measuring or observing the wellbore, the objects or fluid in the wellbore, or the formation extending beyond the wellbore. In another embodiment, a method for logging data from the wellbore can be used by lowering a conduit into the wellbore, passing a logging tool string from the lower end of the conduit to take measurements, inducing a sensor in a drill stabilizer in the conduit to collect data, and communicate the collected data wirelessly using a communication interface to the logging tool string. A memory storage unit in the drill stabilizer can also be used to collect data. Other embodiments can include alternative variations.

These and other variations and modifications will become apparent to those skilled in the art once the above disclosure is fully appreciated. It is intended that the following claims be interpreted to embrace all such variations and modifications.

What is claimed is:
1. A logging system for use in a wellbore that comprises:
a conduit extending into the wellbore from the surface;
a movable logging tool string that is movable in relation to the conduit, the movable logging tool string having a first sensor, the movable logging tool string being capable of passing from a position within the conduit to a lower position extending outside a lower end of the conduit into the borehole;

a second sensor mechanically affixed to the conduit; and a communication interface including:

a conduit communication device located in the conduit and communicatively coupled to the second sensor; and a logging tool communication device located in the movable logging tool string;

wherein the conduit communication device is configured to provide wireless intra-device communication between the second sensor and the movable logging tool string.

2. The logging system of claim 1, wherein the movable logging tool string is capable of being suspended in the position outside the conduit.

3. The logging system of claim 1, further comprising a memory storage device coupled to the conduit capable of storing measurement data from the second sensor.

4. The logging system of claim 1, further comprising a surface communication and control device located at the surface of the wellbore in communication with the movable logging tool string.

5. The logging system of claim 1, wherein the second sensor is capable of communicating ultrasonic measurements.

6. The logging system of claim 1, wherein the second sensor is capable of communicating micro resistivity measurements.

7. The logging system of claim 1, wherein the second sensor is capable of communicating optical measurements.

8. The logging system of claim 1, wherein the second sensor comprises a measurement electrode.

9. The logging system of claim 1, comprising a stabilizer blade rigidly coupled to the conduit, wherein the stabilizer blade includes at least the second sensor.

10. The logging system of claim 1, wherein the conduit is a drill string comprising a drill stabilizer.

11. The logging system of claim 1, further comprising a memory storage device coupled to the logging tool string capable of storing measurement data from the first sensor.

12. A method for logging data from a wellbore that comprises:

lowering a conduit into the wellbore;

passing a movable logging tool string from the lower end of the conduit further into the wellbore, wherein the movable logging tool string comprises a first sensor;

inducing a second sensor mechanically affixed to the conduit to collect data from the wellbore or a formation;

wirelessly communicating the data collected by the second sensor intra-device from the second sensor to the movable logging tool string through a communication interface; and storing the collected data from the second sensor within the movable logging tool string or communicating the collected data from the movable logging tool string to the surface, or both.

13. The method of claim 12, further comprising collecting data from the movable logging tool string.

14. The method of claim 12, further comprising storing the collected data from the second sensor.

15. The method of claim 12, wherein the communication interface includes electronics to collect data from the second sensor.

16. The method of claim 15, wherein the second sensor is capable of communicating ultrasonic measurements.

17. The method of claim 15, wherein the second sensor is capable of communicating micro-resistivity measurements.

18. The method of claim 15, wherein the second sensor is capable of communicating optical measurements.

19. The method of claim 15, wherein the second sensor comprises a measurement electrode.

20. The method of claim 12, comprising inducing a third sensor coupled to the conduit to collect data from the wellbore.

21. The method of claim 12, further comprising drilling the wellbore.

22. The method of claim 12, further comprising inducing the second sensor to collect data as the conduit is being removed from the wellbore.

23. The method of claim 12, further comprising inducing the first sensor in the movable logging tool string to collect data from the wellbore or the formation.

\* \* \* \* \*